(12) United States Patent
Garcia et al.

(10) Patent No.: US 11,472,377 B2
(45) Date of Patent: *Oct. 18, 2022

(54) INTEGRATED VACUUM FOR MOTOR VEHICLE

(71) Applicant: FCA US LLC, Auburn Hills, MI (US)

(72) Inventors: Ricardo Garcia, Birmingham, MI (US); Glenn W Abbott, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 667 days.

This patent is subject to a terminal disclaimer.

(21) Appl. No.: 16/299,222

(22) Filed: Mar. 12, 2019

(65) Prior Publication Data

US 2019/0210572 A1    Jul. 11, 2019

Related U.S. Application Data

(63) Continuation of application No. 14/831,186, filed on Aug. 20, 2015, now Pat. No. 10,246,060.

(51) Int. Cl.
*B60S 1/64* (2006.01)
*A47L 5/38* (2006.01)
(Continued)

(52) U.S. Cl.
CPC . *B60S 1/64* (2013.01); *A47L 5/38* (2013.01); *A47L 7/0076* (2013.01); *B60N 2/78* (2018.02);
(Continued)

(58) Field of Classification Search
CPC .. A47L 11/4016; A47L 11/30; A47L 11/4083; A47L 7/0004; A47L 11/201
See application file for complete search history.

(56) References Cited

U.S. PATENT DOCUMENTS 3,384,916 A    5/1968 Hockin
3,449,787 A    6/1969 Rothstein et al.
(Continued)

FOREIGN PATENT DOCUMENTS

WO    2606/088434    8/2006

OTHER PUBLICATIONS

International Search Report and Written Opinion dated Oct. 21, 2016 for International Application No. PCT/US2016/046973, International Filing Date Aug. 15, 2016.
(Continued)

*Primary Examiner* — David Redding
(74) *Attorney, Agent, or Firm* — Ralph E. Smith

(57) ABSTRACT

A vehicle having an on-board vacuum includes an interior trim quarter side panel assembly disposed adjacent a third row of seats, and an on-board central vacuum system integrated into the interior trim quarter panel assembly. The interior trim quarter side panel assembly includes an outermost surface, an armrest portion positioned between an inboard sidewall and an outboard sidewall of the interior trim quarter panel assembly, and generally sloping toward an interior floor of the vehicle, and a handle pocket defining an opening in the armrest portion and a cavity below the outermost surface. The on-board central vacuum system includes a vacuum hose coupled to a vacuum motor assembly, and a vacuum nozzle handle coupled to the vacuum hose and nestingly received within the handle pocket such that in a stowed position within the handle pocket cavity, the vacuum nozzle handle is located at or below the outermost surface.

14 Claims, 6 Drawing Sheets

(51) Int. Cl.
*A47L 7/00* (2006.01)
*B60N 2/75* (2018.01)
*A47L 9/00* (2006.01)
*B60R 13/01* (2006.01)

(52) U.S. Cl.
CPC ............ *B60N 2/793* (2018.02); *A47L 9/0027* (2013.01); *B60R 2013/016* (2013.01)

(56) References Cited

U.S. PATENT DOCUMENTS

| | | |
|---|---|---|
| 5,829,091 A | 11/1998 | Ingram et al. |
| 6,490,751 B2 | 12/2002 | Ganzenmuller |
| 6,735,810 B2 | 5/2004 | Najm et al. |
| 7,231,686 B1 | 6/2007 | Matheney |
| 7,266,859 B2 | 9/2007 | Slone |
| 8,296,897 B2 | 10/2012 | Moore |
| 2004/0107528 A1 | 6/2004 | LeClear et al. |
| 2004/0134013 A1 | 7/2004 | Slone |
| 2012/0210536 A1 | 8/2012 | Jan et al. |

OTHER PUBLICATIONS

Kiley, D., "Grand Blvd: How a Vacuum Cleaner Out-Buzzed Rolls Royce at the Auto Show," autoblog.com, Mar. 29, 2013, http://m/autoblog.com/article/honda-odyssey-vacuum/.

INTEGRATED VACUUM FOR MOTOR VEHICLE

CROSS REFERENCE TO RELATED APPLICATION

This application claims the benefit of U.S. application Ser. No. 14/831,186, filed Aug. 20, 2015, the contents of which are incorporated herein in their entirety by reference thereto.

FIELD

The present application relates generally to vacuum cleaner systems incorporated on motor vehicles and, more particularly, to a central vacuum cleaner system having a vacuum nozzle handle that integrates into the interior trim of the vehicle in a recessed and stowed position.

BACKGROUND

Vacuum cleaner systems have been provided on automotive motor vehicles to offer a convenient way to clean the interior of the vehicle. Such systems have included the vacuum motor assembly on-board the vehicle. Vacuum systems are particularly popular in the mini-van or sport utility vehicle market segment where three rows of seats are offered and children are the typical rear occupants. With an on-board vacuum system, a user need not be required to transport or move a stand-alone vacuum to a location near or into the vehicle to vacuum the vehicle interior.

While the on-board systems available today provide convenience, they can still be difficult to operate and are generally unsightly in the vehicle. For example, manipulation of the vacuum nozzle and intake hose can be difficult within the vehicle given the tight surroundings. Moreover, some vacuum configurations incorporate the vacuum nozzle in a rear cargo area making it difficult to vacuum interior space in front of a third row of seats. Thus, while vacuum cleaner systems work for their intended purpose, there remains a need for improvement in the relevant art.

SUMMARY

In one exemplary aspect of the invention, a vehicle having an on-board vacuum is provided. The vehicle includes a first, second, and third row of seats, an interior trim quarter side panel assembly disposed adjacent the third row of seats, and an on-board central vacuum system integrated into the interior trim quarter panel assembly. The interior trim quarter side panel assembly includes an outermost surface, an armrest portion positioned between an inboard sidewall and an outboard sidewall of the interior trim quarter panel assembly, and generally sloping toward an interior floor of the vehicle, and a handle pocket defining an opening in the armrest portion and a cavity below the outermost surface. The on-board central vacuum system includes a vacuum hose coupled to a vacuum motor assembly, and a vacuum nozzle handle coupled to the vacuum hose and nestingly received within the handle pocket such that in a stowed position within the handle pocket cavity, the vacuum nozzle handle is located at or below the outermost surface of the interior trim quarter panel assembly. The vacuum hose slidably advances through the handle pocket from behind the interior trim quarter panel assembly when the vacuum nozzle handle moves from the stowed position within the handle pocket to a use position outside of the handle pocket.

In addition to the foregoing, the described vehicle may include one or more of the following features: wherein the opening of the handle pocket extends longitudinally between a first width portion and a second width portion, the first width portion being wider than the second width portion and sized and shaped to accommodate a grasping hand around the nozzle handle; wherein the second width portion is sized and shaped relative to the nozzle handle such that it does not accommodate the grasping hand around the nozzle handle; wherein the handle pocket cavity includes a low power lamp and a power button, and wherein in the stowed position, the vacuum nozzle handle covers and conceals the low power lamp and the power button; and wherein the low power lamp is electrically connected to a vehicle electronic control unit and is configured to illuminate if the vehicle electronic control unit determines that insufficient power is available to run the vacuum motor assembly.

In addition to the foregoing, the described vehicle may include one or more of the following features: wherein a plurality of standoffs are positioned in the handle pocket and extend into the cavity, the standoffs configured to space the stowed vacuum nozzle handle from an inner wall at least partially defining the cavity; wherein a tang is positioned in the handle pocket and extends into the cavity, the tang configured to engage and secure to a detent formed in the vacuum nozzle handle to thereby secure the vacuum nozzle handle in the stowed position; and wherein the opening of the handle pocket includes an absence of a door to cover the opening, and the vacuum nozzle handle is substantially flush with the outermost surface of the interior trim quarter panel assembly when in the stowed position.

In addition to the foregoing, the described vehicle may include one or more of the following features: a storage cavity adjacent to the handle pocket, the storage cavity housing vacuum accessories therein; wherein the vacuum motor assembly includes a housing, a motor, and a debris bag located beneath the outermost surface of the interior trim quarter panel assembly; wherein the handle pocket defines a hose passage, wherein the vacuum hose slidably advances through the hose passage when the vacuum nozzle handle moves from the stowed position to the use position; a storage cavity defined in the armrest portion below the outermost surface and having a bin portion to store vacuum accessories such that in a stowed position within the storage cavity, the vacuum accessories do not protrude into an interior space of the vehicle; a door covering the storage cavity and a track associated with the storage cavity, wherein the door slides along the track between a closed position and an open position; and wherein the door comprises a corrugated door.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
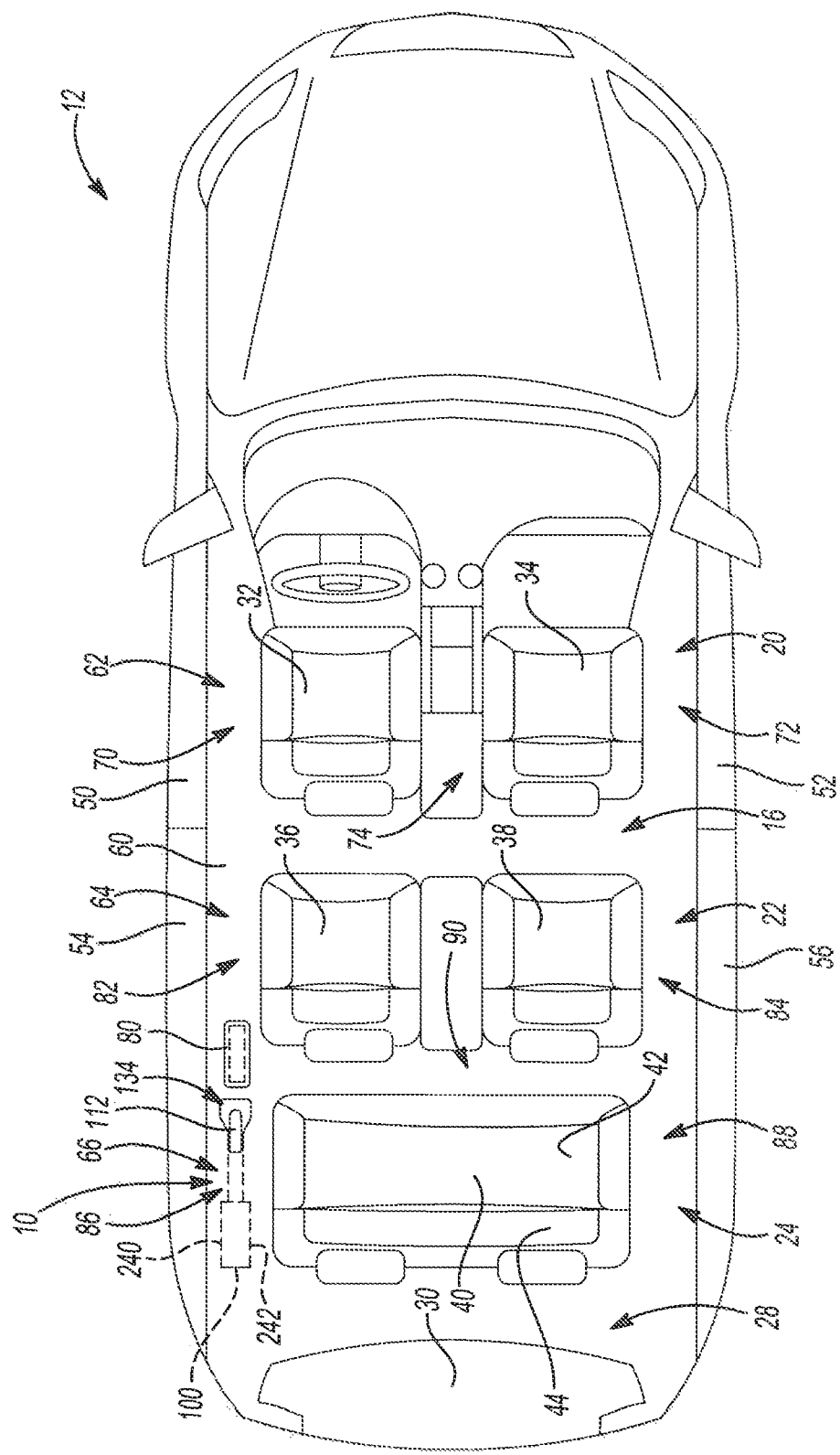
FIG. 1 is a top view of an exemplary vehicle incorporating an on-board central vacuum system according to one example of the present disclosure.

With initial reference to FIG. 1, an on-board central vacuum system constructed in accordance to one example of the present disclosure is shown and generally identified at reference numeral 10. The on-board central vacuum system 10 is illustrated configured for use in a vehicle 12 having an interior space 16 that includes a first row of seats 20, a second row of seats 22 and a third row of seats 24. The vehicle 12 further includes a rear cargo area 28 positioned generally between the third row of seats 24 and a rear door 30. In the example shown, the first row of seats 20 comprises a front driver seat 32 and a front passenger seat 34. The second row of seats 22 comprises a first captain chair 36 and a second captain chair 38. The third row of seats 24 comprises a rear bench 40. The rear bench 40 includes a set portion 42 and a backrest portion 44. Other configurations are contemplated. For example, the second row of seats 22 can include a bench similar to the rear bench 24. The particular vehicle layout shown is for a mini-van, sport utility or crossover vehicle. It will be appreciated however that the on-board central vacuum system 10 may be used in other vehicles having other configurations such as those having only two rows of seats.

Additional features of the vehicle 12 will now be described. The vehicle 12 includes a front driver side door 50, a front passenger side door 52, a second row driver side door 54 and a second row passenger side door 56. The vehicle 12 further includes interior trim collectively identified at reference 60. The interior trim 60 includes first row trim 62, second row trim 64 and third row trim 66. As used herein the term "trim" is used to denote any hard or soft surfaces within the interior of the vehicle 12. While not limited, the interior trim 60 used as part of the on-board central vacuum system 10 includes hard plastic surfaces that generally flow within the vehicle interior adjacent to the first, second and third rows of seats 20, 22 and 24.

The first row trim 62 includes first row driver side trim 70, first row passenger side trim 72 and a center console 74 generally positioned between the driver seat 32 and the passenger seat 34. The second row trim 64 includes second row driver side trim 82 and second row passenger side trim 84. The third row trim 66 includes third row driver side trim 86 and third row passenger side trim 88. The vehicle 12 further includes an interior floor 90 that extends throughout the vehicle 12 and generally defines a lower boundary of the interior space 16.

With continued reference to FIG. 1 and additional reference to FIGS. 2-5, the on-board central vacuum system 10 will be further described. The on-board central vacuum system 10 includes a vacuum motor assembly 100, a vacuum hose 110, a vacuum nozzle handle 112, an interior quarter side panel assembly 120 and a series of accessories 122. The vacuum hose 110 is fluidly connected to the vacuum nozzle handle 112. In this regard, and as will become appreciated herein, a user may grasp the vacuum nozzle handle 112 by reaching into the handle pocket 130 and around the vacuum nozzle handle 112. The vacuum nozzle handle 112 may then be removed from the handle pocket during use. A portion of the vacuum hose 110 is pulled through the opening 132 and out of the handle pocket 130 to reach the area to be vacuumed.

The interior quarter side panel assembly 120 is integrated into the interior trim 60 and more particularly into the third row trim 66. The interior quarter side panel assembly 120 includes a storage cavity 124 and a handle pocket 130. The handle pocket 130 defines an opening 132. The handle pocket 130 has a pocket wall 134 that generally defines a cavity 136 (FIG. 3) that nestingly accepts the vacuum nozzle handle 112 as will be described more fully herein. The opening 132 extends longitudinally between a first width portion 140 and a second width portion 142. The first width portion 140 is wider than the second width portion 142. The first width portion 140 is wide enough to accommodate a grasping hand around the nozzle handle 112.

Figure 2:
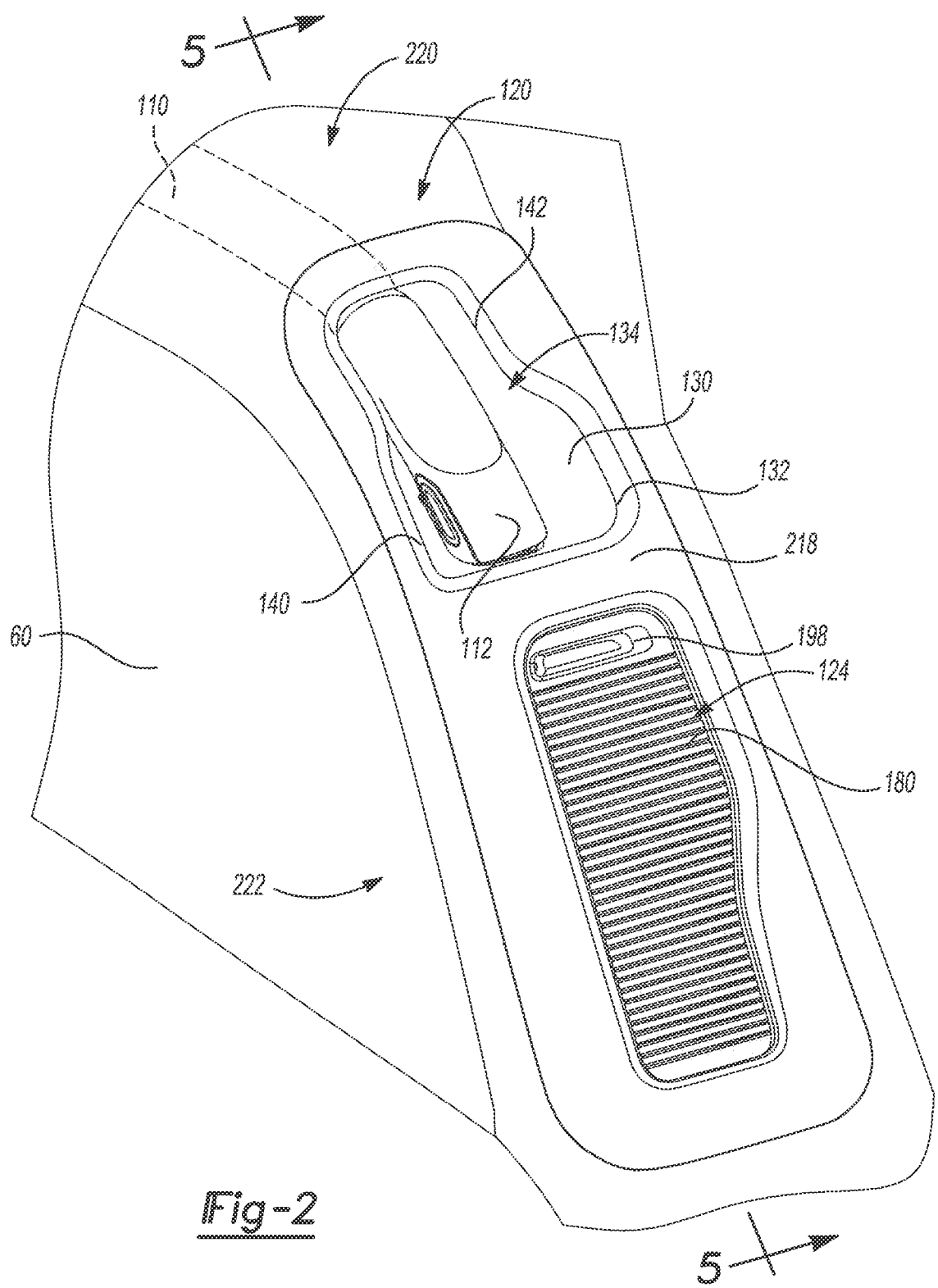
FIG. 2 is a perspective view of an interior quarter side panel assembly of the vehicle that incorporates a vacuum nozzle handle and a series of accessories according to the principles of the present disclosure.
Figure 5:
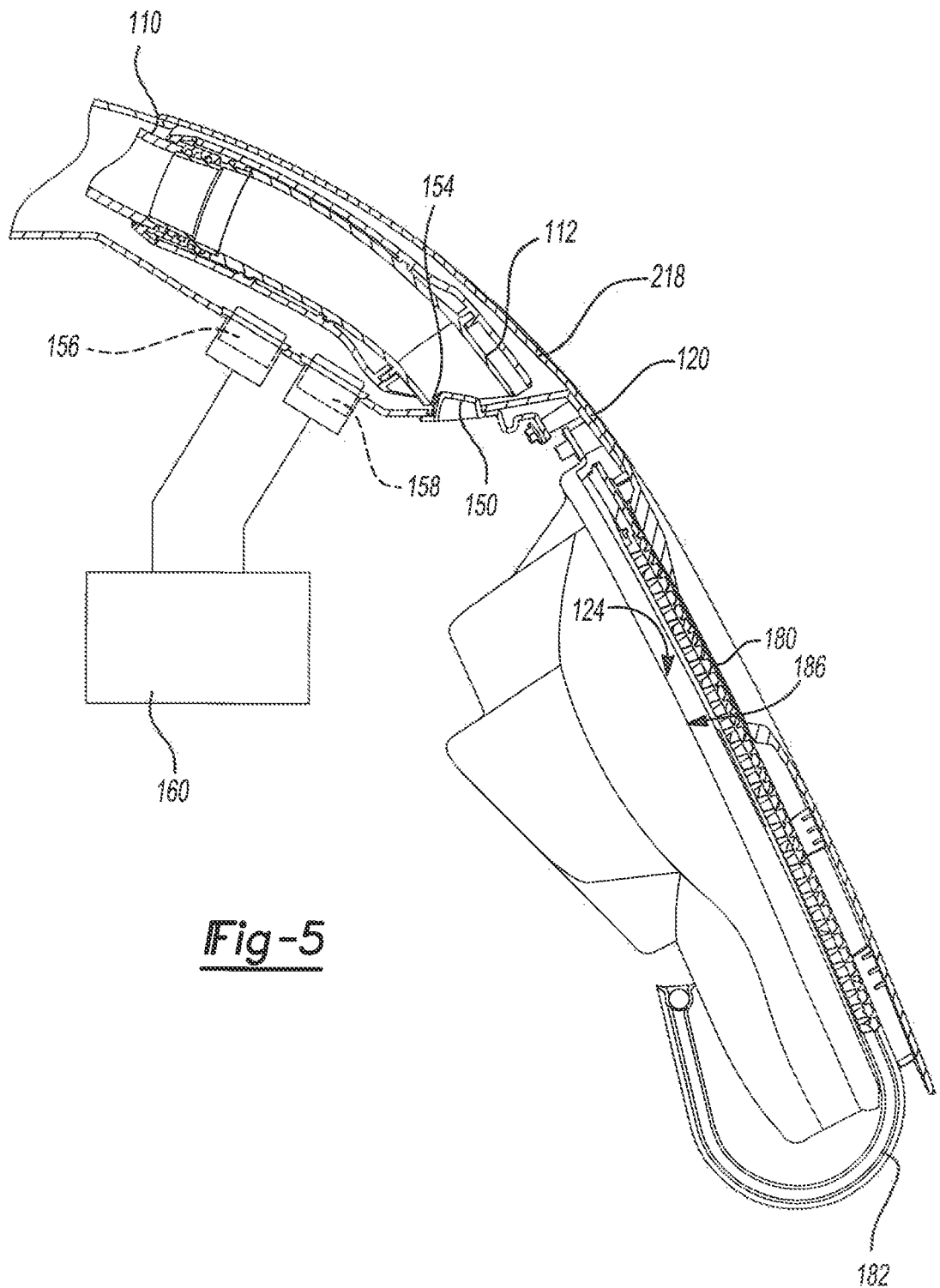
FIG. 5 is a cross-sectional view of the interior quarter side panel assembly taken along lines 5-5 of FIG. 2 according to the principles of the present disclosure.

The handle pocket 130 includes a tang 150 that extends into the cavity 134. The tang 150 is configured to engage and secure to a detent 154 formed on the nozzle handle 112 (FIG. 5). A low power lamp 156 and a power button 158 are positioned in the cavity 136 of the handle pocket 130. The low power lamp 156 and the power button 158 can be electrically connected to a vehicle electronic control unit 160 (FIG. 5). The low power lamp 156 is configured to illuminate if the vehicle electronic control unit 160 determines that insufficient power is available to run the vacuum assembly 10. The power button 158 is depressed to turn the vacuum assembly 10 on and off. A series of stand-offs 170 are positioned in the handle pocket 130 and extend generally into the cavity 134. The stand-offs 170 are formed of compliant material or plastic and offset the nozzle handle 112 from the pocket wall 132 of the handle pocket 130. The stand-offs 170 further position the nozzle handle 112 in a ready position for a user to easily grasp when in a stowed position (FIG. 2)

Figure 3:
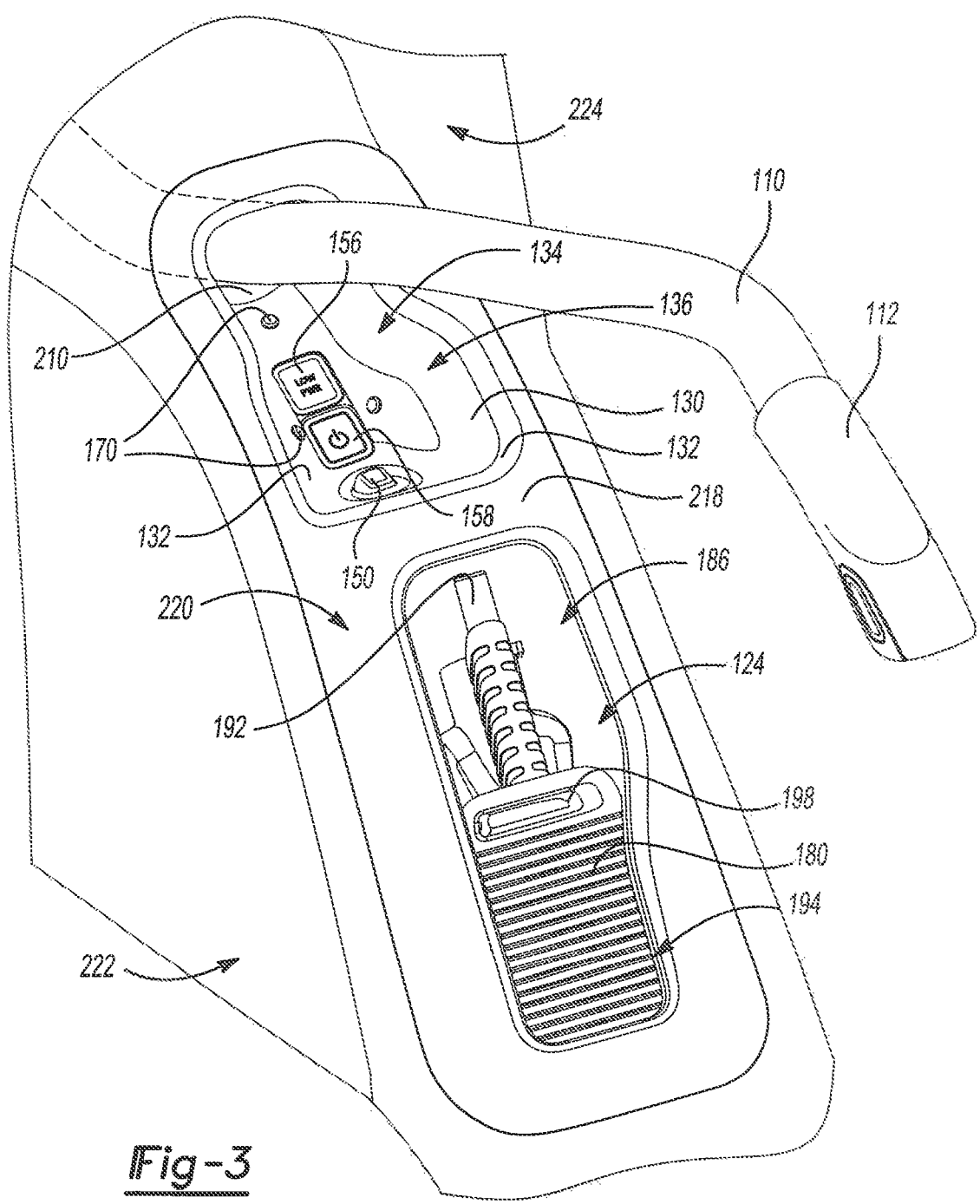
FIG. 3 is a perspective view of the interior quarter side panel of FIG. 2 and shown with the vacuum nozzle handle removed from a handle pocket and a sliding door of a storage cavity moved toward an open position according to the principles of the present disclosure.
Figure 4:
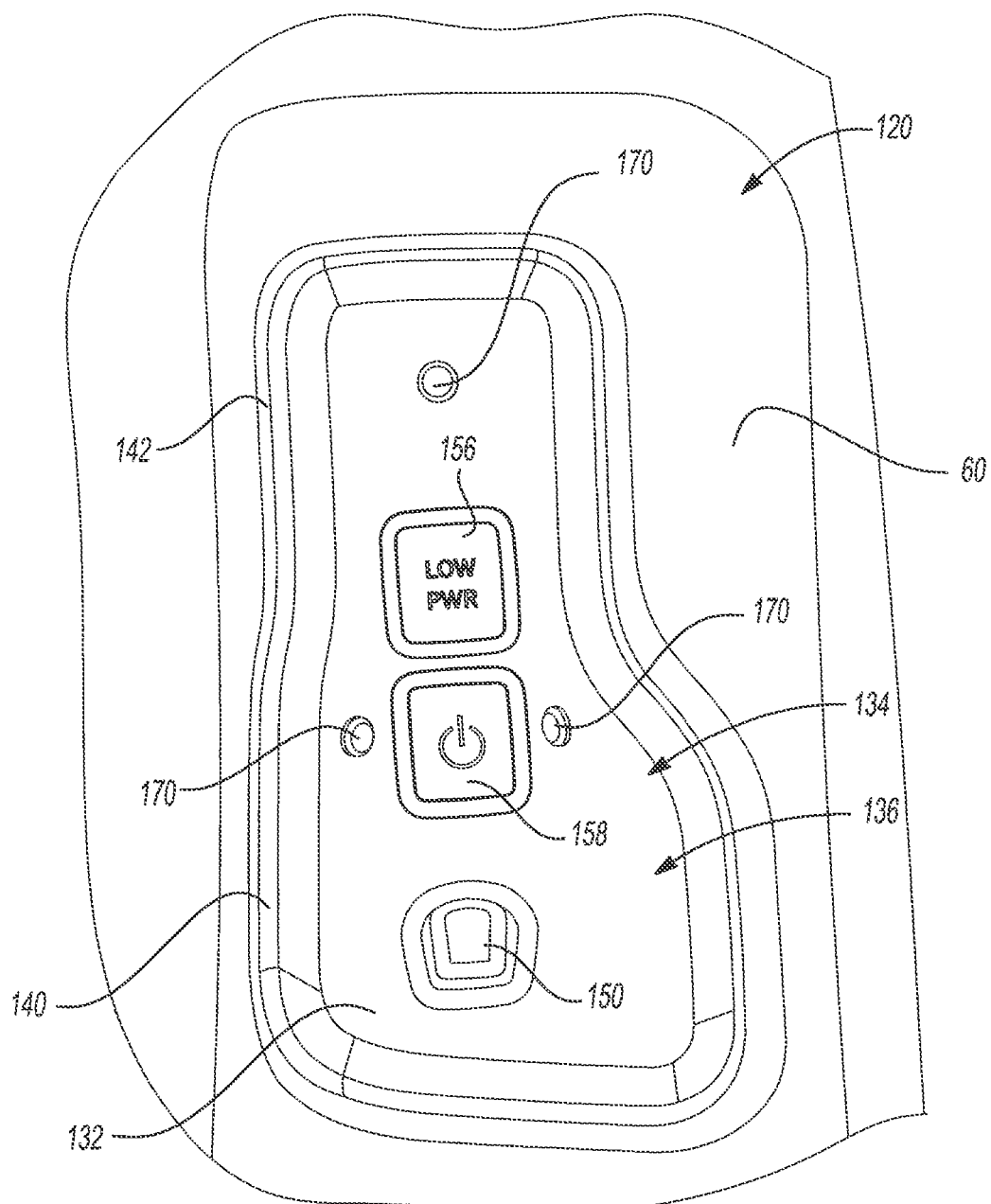
FIG. 4 is a top view of a cavity of the handle pocket according to the principles of the present disclosure.

The storage cavity 124 includes a sliding door 180 that slidably negotiates along a track 182 between a closed position (FIG. 2) to an open position (FIG. 3). Movement of the track 182 to the open position reveals a bin portion 186 that stores the accessories 122. The accessories 122 include a narrow attachment 192 and a triangular upholstery attachment 194. Additional or other accessories may be included. The sliding door 180 is corrugated and includes a recessed handle 198 that can be engaged by a user when moving the sliding door 180 between the closed and open positions.

As will become appreciated herein, the on-board central vacuum system 10 provides a vacuum system integrated into the vehicle 12 that allows an operator ease of use and clean integration into the interior space 16. In this regard, as best shown in FIG. 2, the vacuum nozzle handle 112 is recessed into the cavity 136 of the interior quarter side panel assembly 120. As such, the vacuum nozzle handle 112 does not protrude into the interior space 16, yet allows easy access to grasp the vacuum nozzle handle 112 at the first width portion 140. Once a user grabs the vacuum nozzle handle 112, the hose 110 may be pulled out through the handle pocket 130. The hose 110 slides along a hose passage 210 provided under the interior quarter side panel assembly 120. The user may turn on the vacuum system 10 by pushing the power button 158. When the user has completed vacuuming, the hose 110 and vacuum nozzle handle 112 are returned to the position shown in FIG. 2.

The interior quarter side panel assembly 120 includes an outermost surface 218 having an armrest portion 220 positioned generally between an inboard sidewall 222 and an outboard sidewall 224. The armrest portion 220 generally slopes toward the interior floor 90. The storage cavity 124 and the handle pocket 130 are positioned generally forward on the armrest portion 220 in front of and on a downslope of the portion of interior trim 60 where an occupant would rest an elbow.

Because the storage cavity 124 and a handle pocket 130 are integrated into the interior quarter side panel assembly 120 generally into the armrest portion 220, a vehicle occupant in the third row 40 is not encroached upon by vacuum components and accessories. Rather, the vacuum nozzle handle 112 and door 180 are flush with the interior quarter side panel assembly 120. Further, the storage cavity 124 stores the accessories 122 below the outermost surface 218 of the interior trim 60.

Moreover, because the vacuum nozzle handle 112 and accessories 122 are located next to the rear bench 40 (instead of behind the rear bench 40), a vehicle occupant or user can easily grab the vacuum nozzle handle 112 and vacuum the area at the second and third row of seats 22, 24 without necessarily needing to fold down the third row of seats 24. Specifically, the vacuum nozzle handle 112 and accessories 122 are positioned in front of (toward the first row of seats 20) the backrest portion 44 for easy access. In one exemplary implementation, the vacuum nozzle handle is positioned substantially between the second row of seats 22 and the third row of seats 24 such that a vehicle occupant can easily grab the handle 112 when seated in either of the second or third row of seats 22, 24.

Figure 6:
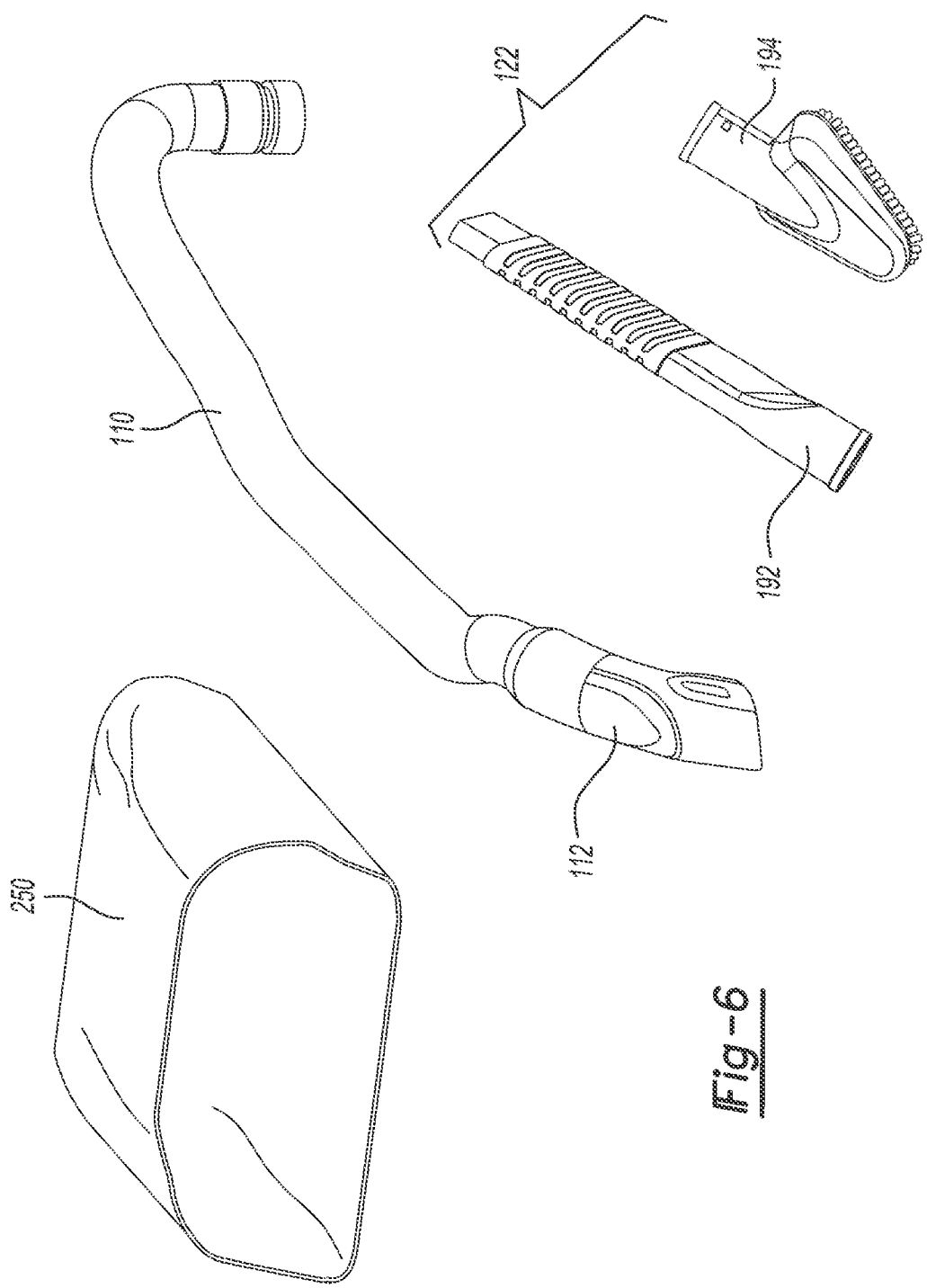
FIG. 6 is an exploded perspective view of exemplary vacuum accessories of the on-board central vacuum system according to the principles of the present disclosure.

With reference now to FIGS. 1 and 6, additional features of the vacuum motor assembly 100 will be described. The vacuum motor assembly 100 generally includes a housing 240, a motor 242 and a debris bag 250. While vacuuming, debris can collect within the debris bag 250 in the housing 240 for later removal by a user.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle having an on-board vacuum, the vehicle comprising:
   a first, second and third row of seats;
   an interior trim quarter side panel assembly disposed adjacent the third row of seats, the interior trim quarter panel assembly including:
     an outermost surface;
     an armrest portion positioned between an inboard sidewall and an outboard sidewall of the interior trim quarter panel assembly, and generally sloping toward an interior floor of the vehicle; and
     a handle pocket defining an opening in the armrest portion and a cavity below the outermost surface; and
   an on-board central vacuum system integrated into the interior trim quarter panel assembly and including:
     a vacuum hose coupled to a vacuum motor assembly; and
     a vacuum nozzle handle coupled to the vacuum hose and nestingly received within the handle pocket such that in a stowed position within the handle pocket cavity, the vacuum nozzle handle is located at or below the outermost surface of the interior trim quarter panel assembly,
     wherein the vacuum hose slidably advances through the handle pocket from behind the interior trim quarter panel assembly when the vacuum nozzle handle moves from the stowed position within the handle pocket to a use position outside of the handle pocket.

2. The vehicle of claim 1, wherein the opening of the handle pocket extends longitudinally between a first width portion and a second width portion, the first width portion being wider than the second width portion and sized and shaped to accommodate a grasping hand around the nozzle handle.

3. The vehicle of claim 2, wherein the second width portion is sized and shaped relative to the nozzle handle such that it does not accommodate the grasping hand around the nozzle handle.

4. The vehicle of claim 1, wherein the handle pocket cavity includes a low power lamp and a power button, and wherein in the stowed position, the vacuum nozzle handle covers and conceals the low power lamp and the power button.

5. The vehicle of claim 4, wherein the low power lamp is electrically connected to a vehicle electronic control unit and is configured to illuminate if the vehicle electronic control unit determines that insufficient power is available to run the vacuum motor assembly.

6. The vehicle of claim 1, wherein a plurality of standoffs are positioned in the handle pocket and extend into the cavity, the standoffs configured to space the stowed vacuum nozzle handle from an inner wall at least partially defining the cavity.

7. The vehicle of claim 1, wherein a tang is positioned in the handle pocket and extends into the cavity, the tang configured to engage and secure to a detent formed in the vacuum nozzle handle to thereby secure the vacuum nozzle handle in the stowed position.

8. The vehicle of claim 1, wherein the opening of the handle pocket includes an absence of a door to cover the opening, and the vacuum nozzle handle is substantially flush with the outermost surface of the interior trim quarter panel assembly when in the stowed position.

9. The vehicle of claim 1, further comprising a storage cavity adjacent to the handle pocket, the storage cavity housing vacuum accessories therein.

10. The vehicle of claim 1, wherein the vacuum motor assembly includes a housing, a motor, and a debris bag located beneath the outermost surface of the interior trim quarter panel assembly.

11. The vehicle of claim 1, wherein the handle pocket defines a hose passage, wherein the vacuum hose slidably advances through the hose passage when the vacuum nozzle handle moves from the stowed position to the use position.

12. The vehicle of claim 1, further comprising a storage cavity defined in the armrest portion below the outermost surface and having a bin portion to store vacuum accessories such that in a stowed position within the storage cavity, the vacuum accessories do not protrude into an interior space of the vehicle.

13. The vehicle of claim 12, further comprising a door covering the storage cavity and a track associated with the storage cavity, wherein the door slides along the track between a closed position and an open position.

14. The vehicle of claim 13, wherein the door comprises a corrugated door.

* * * * *